United States Patent [19]

Blake, Jr. et al.

[11] 4,074,087
[45] Feb. 14, 1978

[54] BIDIRECTIONAL VOICE FREQUENCY REPEATER

[75] Inventors: Roy Baxter Blake, Jr., Jamestown; James deGoulard Gwatkin, III; Judy Pat Magee, both of Greensboro; Glendon Russell Porter, Greensboro, all of N.C.

[73] Assignee: Bell Telephone Laboratories, Incorporated, Murray Hill, N.J.

[21] Appl. No.: 714,306

[22] Filed: Aug. 16, 1976

[51] Int. Cl.² ........................ H04B 3/20; H04B 1/58; H04B 3/36
[52] U.S. Cl. ............................. 179/170.2; 179/170 R
[58] Field of Search ....... 179/170 R, 170 D, 170 NC, 179/170 T, 170.2

[56] References Cited

U.S. PATENT DOCUMENTS

| | | | |
|---|---|---|---|
| 3,586,793 | 6/1971 | Neal | 179/170.2 |
| 3,828,146 | 8/1974 | Lewis | 179/170 NC |
| 3,855,431 | 12/1974 | Stewart | 179/170 NC |
| 3,872,266 | 3/1975 | Baxter, Jr. | 179/170 R |
| 3,889,072 | 6/1975 | Stewart | 179/170 R |
| 3,904,838 | 9/1975 | Stewart | 79/170 R |
| 3,934,099 | 1/1976 | Elder, Jr. | 179/170 NC |
| 3,970,805 | 7/1976 | Thomas | 179/170 NC |
| 3,973,089 | 8/1976 | Puckette | 179/170 NC |

*Primary Examiner*—William C. Cooper
*Assistant Examiner*—Randall P. Myers
*Attorney, Agent, or Firm*—Thomas Stafford

[57] ABSTRACT

Hybridless bidirectional transmission networks typically include telephone line coupling transformers and unidirectional amplifiers for enhancing outgoing and incoming signals. Unwanted signal components in the outgoing direction, caused by cross coupling via the transformer of incoming signals, are minimized by employing a canceller network in circuit with the incoming and outgoing amplifiers. The canceller network has a complex transfer characteristic to compensate substantially for complex impedance components of the coupling transformer and 2-wire transmission facility and to generate a signal which is substantially a replica of the unwanted outgoing signal components. The replica signal and unwanted signal components are algebraically combined in the outgoing amplifier effectively to eliminate the unwanted signal components from the outgoing path. In a first embodiment the canceller network has an attenuation versus frequency characteristic yielding a prescribed second-order complex transfer characteristic while in a second embodiment the canceller network has an attenuation versus frequency characteristic yielding a prescribed fourth-order complex transfer characteristic. In the second embodiment values of predetermined pole-zero pairs are selectively adjustable to match impedance components of different 2-wire transmission facilities.

17 Claims, 5 Drawing Figures

BIDIRECTIONAL VOICE FREQUENCY REPEATER

BACKGROUND OF THE INVENTION

This invention relates to transmission networks and, more particularly, to bidirectional voice frequency repeaters.

In telephone and similar communication systems it is often required to enhance signals being transmitted over a 2-wire bidirectional transmission path. Additionally, it is often required to couple a 2-wire bidirectional transmission path to a 4-wire transmission path including an incoming path and an outgoing path. Signal enhancement in a bidirectional 2-wire transmission path typically is realized by employing hybrid circuits to couple signals on the 2-wire path to separate unidirectional paths each including unidirectional amplifiers. Similar arrangements are employed for 2-to-4 wire and 4-to-2 wire transmission path coupling except that only one hybrid circuit is required. Heretofore, special transformers and precision balancing networks have been used in hybrid arrangements. Use of such transformers and balancing networks is undesirable because of cost, size and difficulty in adjusting the balance circuit to match the impedance of the incoming lines. Recently, automatic balancing networks have been developed for this purpose. However, their complexity and cost have limited their use.

So-called electronic hybrid arrangements have been proposed for coupling a 2-wire bidirectional transmission path to a 4-wire path including two unidirectional paths which may or may not include amplification for enhancing signal transmission on the bidirectional path. In one such electronic hybrid first and second transformers are employed to couple unidirectional amplification stages into the bidirectional 2-wire transmission path. Signals from a first direction are supplied from a first 2-wire path via the first transformer to a first one of the unidirectional amplification stages and, then, via the second transformer to a second 2-wire path. Similarly, signals from a second direction are supplied from a second 2-wire path via the second transformer to a second one of the unidirectional amplification stages and, then, via the first transformer to the first 2-wire path, thereby providing amplification for both directions of transmission on the bidirectional 2-wire transmission path.

One problem with this prior known arrangement is that a portion of the signal being transmitted in each direction on the 2-wire path appears at and is amplified by the amplification stage for the opposite direction of transmission. That is to say, there is some cross coupling of signals being transmitted in each direction resulting in error signals. Consequently, the outputs from the amplification stages are distorted by the so-called error signals. Several so-called hybridless bidirectional repeaters have been proposed which attempt to minimize the effects of these error signals. In one particular circuit, a portion of the signal developed at the output of each unidirectional amplificiation stage is supplied to an input of the other unidirectional amplification stage where it is combined with the input from the associated transformer in an attempt to cancel the error signal developed across the transformer associated with the amplification stage. This is achieved by employing resistive elements to couple a portion of each amplifier output to an input of the other amplifier. One problem with this approach is that the use of resistive elements does not provide compensation for the complex impedance presented by most transmission paths, for example, 2-wire telephone lines or the like, or for the complex impedance presented by the coupling transformers. Consequently, the prior known circuits are, at best, limited to applications involving connection to purely resistive impedances as distinguished from complex impedances presented by real telephone lines. Indeed, this prior hybridless bidirectional repeater circuit is known to suffer from frequency instability and when employed to realize practical gain lvels with real telephone lines may oscillate, cause echo signals, or both.

These problems of the prior known arrangement may be partially mitigated by employing a line build-out network in an attempt to make the transmission path appear to be purely resistive. Use of a line build-out network is undesirable because of cost and difficulty of adjustment. Additionally, interaction between gain and impedance adjustments in such prior arrangements further complicates adjustment procedures. Moreover, the line buildout network still would not compensate for the complex impedance of the coupling transformer. Indeed, if a line build-out network is employed in the transmission path, additional distortion components are, therefore, added to the signals being transmitted which would necessarily require additional equalization, again increasing complexity and cost of the bidirectional hybridless repeater.

SUMMARY OF THE INVENTION

These and other problems are resolved in accordance with the inventive principles to be described herein in a hybridless bidirectional voice frequency repeater.

In one embodiment of the instant invention a coupling transformer is employed to connect a bidirectional 2-wire transmission path or facility to a 4-wire transmission path or facility including an outgoing path and an incoming path each of which may include an amplifier stage. The outgoing amplifier stage includes first and second inputs and an output with the first input being connected in circuit with a winding of the coupling transformer. Similarly, the incoming amplifier stage includes first and second inputs and an output with the output connected in circuit relationship with the winding of the coupling transformer. An error signal developed across the transformer winding because of the complex impedance of the 2-wire transmission path or facility and the complex impedance of the coupling transformer in response to signals from the incoming amplifier stage are compensated in accordance with an aspect of the invention by employing an active canceller network having a complex transfer characteristic for generating a compensating signal which is substantially a replica of the error signal. The active canceller network is connected in circuit between the output of the incoming amplifier and the second input of the outgoing amplifier so that the replica signal is supplied to the outgoing amplifier stage where it is algebraically combined with the error signal to yield an outgoing signal substantially free of error signal components caused by cross coupling of the incoming signals to the outgoing path in the repeater.

In one specific embodiment of the subject invention, an active canceller network is employed having a complex fourth-order transfer characteristic, i.e., attenuation versus frequency function, including a first pole-zero pair employed substantially to emulate the complex impedance of the coupling transformer and which affects the canceller network transfer characteristic in a "low" frequency range; a second pole-zero pair which is dependent on the gauge of the 2-wire transmission path or facility and which affects the transfer characteristic of the canceller network in the "low" to "mid" frequency range; and a quadratic pair of poles and a quadratic pair of zeros which affect the canceller network transfer characteristic in the "high" frequency range. Individual ones of the pole-zero pairs are selectively adjustable to match the canceller network attenuation versus frequency function, i.e., transfer characteristic to specific characteristics of the particular 2-wire transmission path or facility to which the repeater of the instant invention is connected, for example, capacitance and wire gauge.

In another embodiment of the invention a so-called compromise canceller network is employed having a complex second-order transfer characteristic, i.e, attenuation versus frequency function for emulating the complex impedance of the coupling transformer and the complex impedance of a telephone switch network. The transfer characteristic of the compromise canceller network includes first and second pole-zero pairs for emulating a so-called office 2-wire facility which may be represented by a fixed resistor of known value in series with a fixed capacitor of known value and the characteristic of the coupling transformer.

In another exemplary embodiment of the instant invention, signals being transmitted on a 2-wire bidirectional transmission path or facility are enhanced by employing first and second coupling transformers adapted to connect first and second amplifier stages to first and second 2-wire transmission paths or facilities. Each amplifier stage has first and second inputs and an output. A first input of the first amplifier is connected in circuit with a winding of the first coupling transformer and the output is connected in circuit relationship with a winding of the second transformer. Similarly, the first input of the second amplifier is connected in circuit with the winding of the second transformer and the output is connected in circuit relationship with the winding of the first transformer. A first active canceller network having a complex transfer characteristic is connected in circuit between the output of the second amplifier and the second input of the first amplifier. Similarly, a second active canceller network having a complex transfer characteristic is connected in circuit between the output of the first amplifier and the second input of the second amplifier. The first active canceller network has a complex transfer characteristic for emulating the complex impedance of the first 2-wire transmission path or facility and the complex impedance of the first coupling transformer, while the second active canceller network has a complex transfer characteristic for emulating the complex impedance of the second 2-wire transmission path or facility and the second coupling transformer. The first and second canceller networks are operative to generate signals which are substantially equal to or replicas of error signals developed across the first and second transformer windings, respectively, because of the complex impedance reflected to the windings from the first and second 2-wire transmission paths or facilities and the complex impedance of the first and second transformers, respectively, in response to signals from outputs of the second and first amplifiers, respectively. Then, the replica signals are algebraically combined with the corresponding outgoing signal including error signals by the first and second amplifiers to yield outgoing signals in each direction of transmission substantially free of error signal components.

BRIEF DESCRIPTION OF THE DRAWINGS

These and other objects and advantages of the invention will be more fully understood from the following descriptions of exemplary embodiments of the invention taken in accordance with the appended drawings in which.

DETAILED DESCRIPTION

Figure 1:
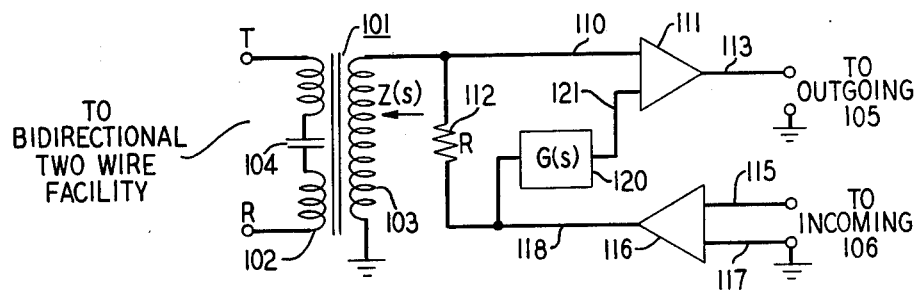
FIG. 1 shows in simplified block diagram form one embodiment of the invention for coupling a 2-wire transmission facility to a 4-wire transmission facility.

FIG. 1 shows in simplified block diagram form a so-called hybridless voice frequency repeater illustrating one embodiment of the instant invention. The embodiment of FIG. 1 is intended to couple a 2-wire bidirectional transmission path or facility, for example, a 2-wire telephone line, to a 4-wire transmission path or facility, and is intended primarily for use with loaded telephone lines of types now well known, for example, 19, 22, 24, 25 and 26 gauge 2-wire cable. However, the principles of the invention described herein are not limited to loaded cable and are equally applicable to non-loaded telephone transmission facilities.

Accordingly, shown in FIG. 1 is coupling transformer 101 including primary winding 102 and secondary winding 103. Included in winding 102 is so-called midpoint capacitor 104 which is employed in well-known fashion for extracting signaling information. Transformer 101 is adapted to connect or couple a bidirectional 2-wire transmission path or facility, for example, a 2-wire telephone line of the loaded type, to a 4-wire transmission path or facility, also of a type well known in the art, including outgoing path 105 and incoming path 106. Transformer 101 may be any one of numerous coupling transformers known in the art and preferably has a 1:1 turns ratio.

A first terminal of winding 103 is connected to a reference potential point, for example, ground potential, while a second terminal of winding 103 is connected to first input 110 of gain unit 111 and to a first terminal of resistor 112. Output 113 of gain unit 111 is adapted to be connected to outgoing path 105. Similarly, first input 115 of gain unit 116 is adapted to be connected to incoming path 106 while second input 117 is connected to a reference potential point, for example, ground potential. Output 118 of gain unit 116 is connected to a second terminal of resistor 112 and to an input of active canceller network 120. An output of canceller network 120 is connected in circuit with second input 121 of gain unit 111. It should be noted that gain units 111 and 116 are substantially unidirectional amplifiers of the differential type having relatively low output impedance.

Figure 3:
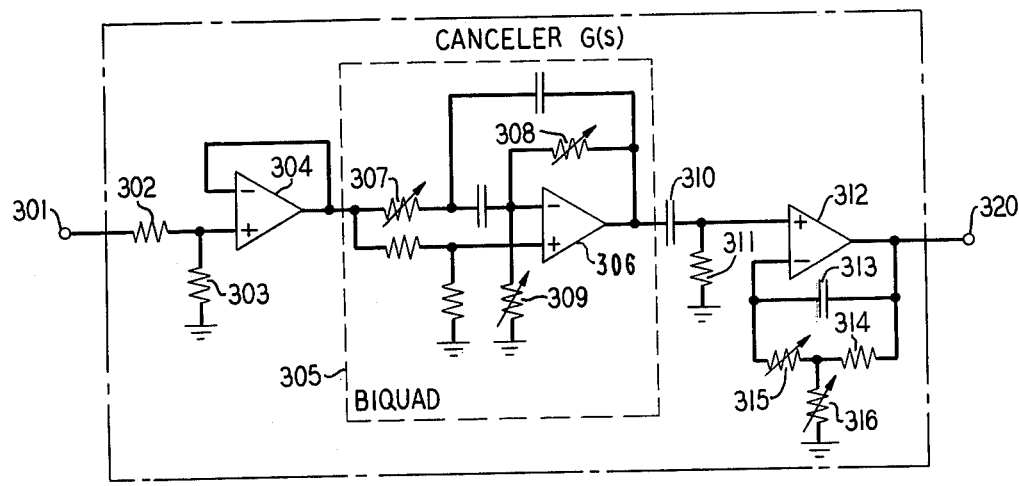
FIG. 3 shows details of one active canceller network which may be employed in the embodiments of FIGS. 1 and 2.
Figure 4:
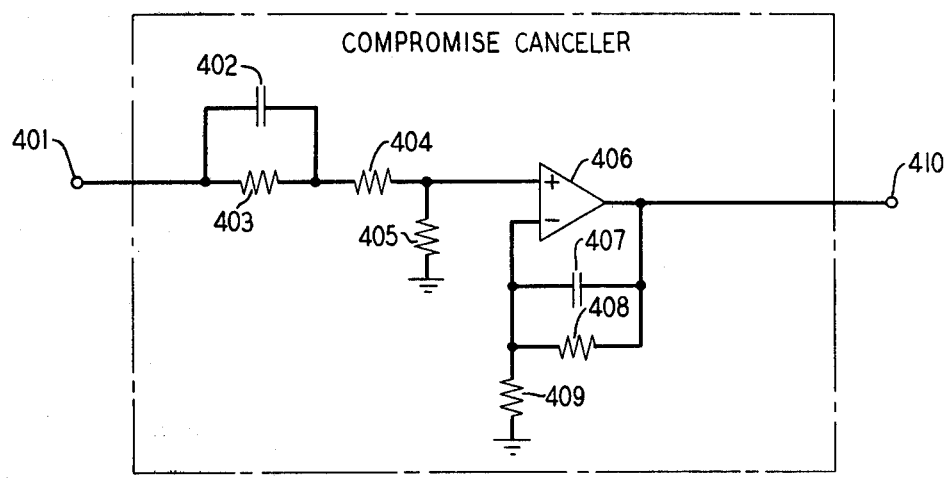
FIG. 4 shows details of another canceller network which may also be employed in the embodiments of FIGS. 1 and 2.
Figure 5:
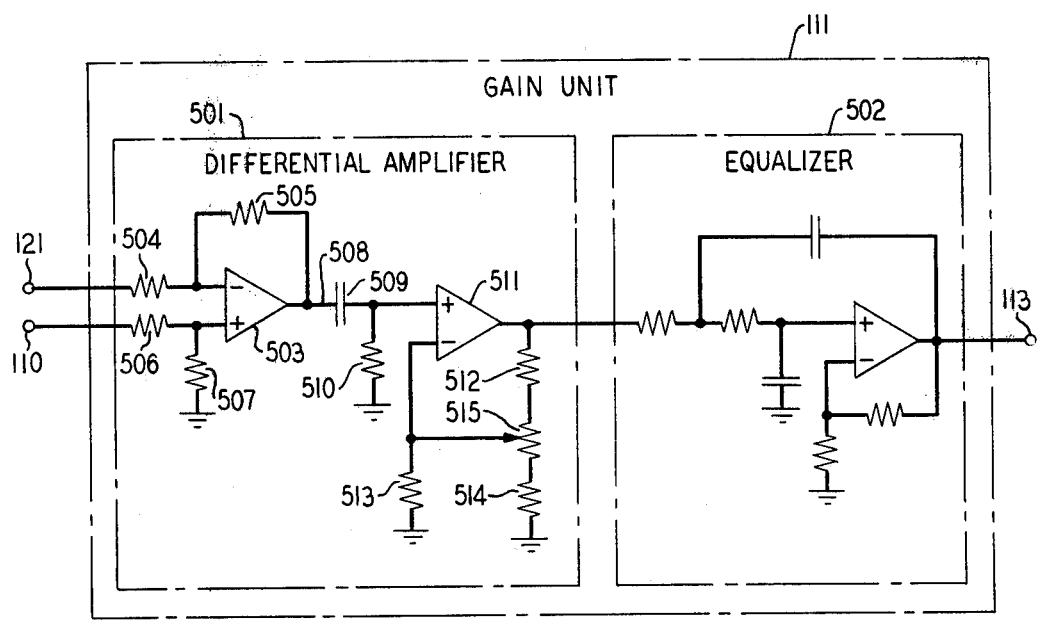
FIG. 5 depicts details of the gain units utilized in the embodiments of FIGS. 1 and 2.

Details of gain units which may be employed in this embodiment of the invention are shown in FIG. 5 to be described below. Details of active canceller networks which may be employed for canceller network 120 are shown in FIGS. 3 and 4, also to be described below.

In practice, a 2-wire telephone transmission facility, for example, a loaded 2-wire telephone cable, is connected across the tip (T) and ring (R) terminals of winding 102 of the subject repeater. Additionally, it is desirable that a so-called build-out capacitor (not shown) also be connected across terminals T and R in order to build out the capacitance value of the connected telephone facility to that of a prescribed length of cable. Consequently, the complex impedance of the 2-wire transmission path or facility, i.e., telephone cable, including the build-out capacitor and the complex impedance of the transformer, appear across winding 103, namely Z(s).

Thus, as will be apparent, error signal VE is developed across winding 103 in response to incoming signals Vin from gain unit 116, namely $$VE = Vin\left(\frac{1}{1 + R/Z(s)}\right) \quad (1)$$

where Vin is the output from gain unit 116, R is the resistance value of resistor 112 and Z(s) is the complex impedance looking into winding 103 when a 2-wire facility is connected across terminals T and R of winding 102 of transformer 101.

Error signal VE is supplied, in addition to the normal outgoing signal from the bidirectional transmission facility, to input 110 of gain unit 111. That is to say, a portion of the signal incoming on path 106 is cross coupled to outgoing path 105 via transformer 101. It should be noted that since the output impedance of gain unit 116 is substantially zero the normal outgoing signals are substantially isolated from incoming path 106, as will be apparent to those skilled in the art. In practice, interfaces between the repeater and 4-wire facility, i.e., paths 105 and 106, are employed to insure proper impedance matching.

Thus, in accordance with one aspect of the invention, unwanted error signal VE is substantially minimized in the outgoing signal from gain unit 111 by employing active canceller network 120 to generate a signal which substantially emulates error signal VE of Equation 1. This is achieved by employing an active canceller network having a complex transfer characteristic substantially equal to $$G(s) = \frac{1}{1 + R/Z(s)} \quad (2)$$

where Z(s) is the complex impedance developed across winding 103 when the subject repeater is connected to a 2-wire transmission facility and R is the resistance value of resistor 112. It should be noted that the value of resistor 112 is selected such that the impedance looking into winding 102 is that of a desired transmission line termination. For example, for loaded 2-wire telephone cable a 900 ohm plus 2.15 microfarad termination is desirable.

Canceller network 120 having complex transfer characteristic G(s) responds to incoming signals Vin developed at output 118 of gain unit 116 to generate a signal which is substantially a replica of error signal VE. This replica signal is supplied to input 121 of gain unit 111 where it is algebraically combined with the normal outgoing signals and error signal VE supplied to input 110 to yield at output 113 a signal substantially free of error signal components. In turn, the error free outgoing signal is supplied to outgoing path 105.

Figure 2:
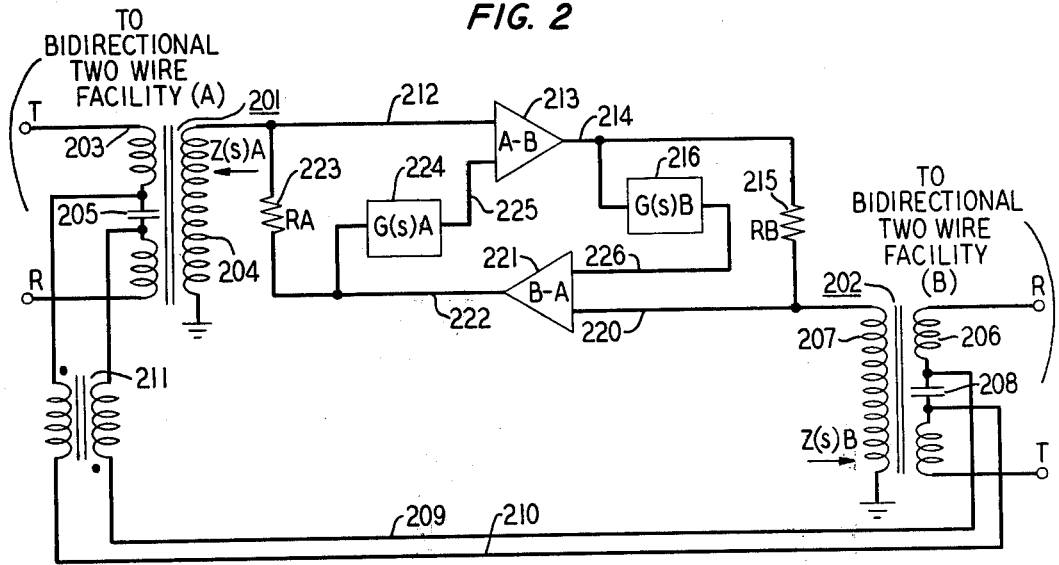
FIG. 2 depicts in simplified block diagram form another embodiment of the invention intended for enhancing signals in a 2-wire bidirectional transmission facility.

FIG. 2 depicts in simplified form another hybridless bidirectional voice frequency repeater illustrating a second exemplary embodiment of the invention for enhancing voice frequency signals being transmitted on a 2-wire bidirectional transmission path or facility. Here again, this embodiment of the invention is intended for use primarily with loaded 2-wire telephone cables but may equally be employed in applications for non-loaded 2-wire telephone cables.

Accordingly, shown in FIG. 2 are coupled transformers 201 and 202 which are adapted for connecting the subject repeater to bidirectional 2-wire transmission facilities A and B, respectively. Facilities A and B are both 2-wire telephone transmission lines, preferably of the loaded type. Transformer 201 includes primary winding 203 and secondary winding 204. Winding 203 includes so-called midpoint capacitor 205 for extracting signaling information. Similarly, transformer 202 includes primary winding 206 and secondary winding 207. Winding 206 also includes midpoint capacitor 208, again for extracting signaling information. Additionally, breakdown diodes (not shown) are employed in well-known fashion across the secondary windings of transformers 201 and 202 to provide voltage surge protection for the repeater.

A first terminal of winding 204 of transformer 201 is connected to a reference potential point, for example, ground potential, while a second terminal of winding 204 is connected to first input 212 of unidirectional gain unit 213. Output 214 of gain unit 213 is connected in circuit relationship via resistor 215 with winding 207 of coupling transformer 202 and is connected in circuit with an input of active canceller network 216. Similarly, one terminal of winding 207 of transformer 202 is connected to a reference potential point, for example, ground potential, while a second terminal is connected to input 220 of unidirectional gain unit 221. Output 222 of gain unit 221 is connected in circuit relationship with winding 204 of transformer 201 via resistor 223 and is connected in circuit with an input of active canceller network 224. An output of active canceller network 224 is connected in circuit with second input 225 of gain unit 213. Similarly, an output of active canceller network 216 is connected in circuit with second input 226 of gain unit 221. Details of gain units 213 and 221 which may be employed in this embodiment of the invention are also shown in FIG. 5, while details of active canceller networks 216 and 224 which may be employed in this embodiment of the invention are shown in FIGS. 3 and 4, also to be described below.

In practice, 2-wire telephone transmission facility A, for example, a loaded 2-wire telephone cable, is connected across tip (T) and ring (R) terminals of winding 203 of transformer 201. As indicated above, it is also desirable that a so-called build-out capacitor (not shown) be connected across terminals T and R of winding 203 when connected to a so-called "near-end" cable section in order to build out the capacitance value of the connected near-end section to that of a prescribed length of cable. Similarly, 2-wire telephone transmission facility B, for example, a 2-wire loaded telephone cable, is connected across the T and R terminals of winding 206 of transformer 202. Again, it is desirable that a so-called build-out capacitor (not shown) be connected across terminals T and R of windin 206 when connected to a so-called "near-end" cable section to build out the capacitance value of telephone facility B to that of a prescribed length of cable. Consequently, the complex impedance of 2-wire transmission facility A when connected to winding 203, including the build-out capacitor when employed and the complex impedance of transformer 201, appears across secondary winding 204, namely Z(s)A. Similarly, the complex impedance of 2-wire transmission of facility B connected to winding 206, including the build-out capacitor when employed and the complex impedance of transformer 202, appear across winding 207, namely Z(s)B. Thus, as will be apparent, error signal VEA is developed across winding 204 of transformer 201 in response to signal VOB developed at output 222 of gain unit 221, for example $$VEA = VOB \left( \frac{1}{1 + RA/Z(s)A} \right) \quad (3)$$

where RA is the resistance value of resistor 223 and ZA(s) is the complex impedance developed across winding 204 when telephone facility A is connected across terminals T and R of winding 203. Similarly, error signal VEB is developed across winding 207 of transformer 202 in response to signal VOA developed at output 214 of gain unit 213, namely $$VEB = VOA \left( \frac{1}{1 + RB/Z(s)B} \right) \quad (4)$$

where RB is the resistance value of resistor 215 and ZB(s) is the impedance developed across winding 207 when transmission facility B is connected across terminals T and R of winding 206 of transformer 202. It should be noted again that since the output impedance of gain units 213 and 226 is extremely low, being substantially zero, the signals normally being transmitted in the two directions of trasmission, namely, direction A to B and direction B to A, are substantially isolated from the opposite paths of transmission, as will be apparent to those skilled in the art. However, error signals VEA and VEB developed across the respective transformer windings are supplied to inputs 212 and 220 of gain units 213 and 221, respectively, which would normally cause error signals to be transmitted in the opposite direction which are undesirable.

Thus, in accordance with an aspect of the subject invention, unwanted error signal VEA is substantially minimized in the transmission path from A to B by employing active canceller network 224 to generate a signal which substantially emulates error signal VEA of Equation 3. This is achieved by employing an active canceller network having a complex transfer characteristic substantially equal to $$G(s)A = \frac{1}{1 + RA/Z(s)A} \quad (5)$$

Active canceller network 224 having transfer characteristic G(s)A responds to signals developed at output 222 of gain unit 221 to generate a signal which is substantially a replica of error signal VEA. This replica signal is supplied to input 225 of gain unit 213 where it is algebraically combined with the normal signals being transmitted from A to B including error signal VEA supplied to input 212 to yield at output 214 a signal substantially free of error signal components.

Similarly, unwanted error signal VEB is substantially minimized in the transmission path from B to A by employing active canceller network 216 to generate a signal which substantially emulates error signal VEB of Equation 4. This is achieved by employing a transfer characteristic substantially equal to $$G(s)B = \frac{1}{1 + RB/Z(s)B} \quad (6)$$

Canceller network 216 having transfer characteristic G(s)B responds to signals developed at output 214 of gain unit 213 to generate a signal which is substantially a replica of error signal VEB. This replica signal is supplied to input 226 of gain unit 221 where it is algebraically combined with the signal normally being transmitted from B to A including error signal VEB which is supplied to input 220 of gain unit 221 to yield at output 222 a signal substantially free of error signal components.

Again, it should be noted that the resistance values of resistors 215 and 223 are selected such that the impedance looking into windings 203 and 206 of transformers 201 and 202 including midpoint capacitors 205 and 208, respectively, is that of a desired transmission line termination. For example, for loaded 2-wire telephone cable a 900 ohm plus 2.15 microfarad termination is desirable.

The signaling information from facilities A and B are bypassed around the subject repeater via circuit connections 209 and 210 which include coils of inductor 211. The coils of inductor 211 are connected to be series opposing in order to insure a high inductance in the bypass circuit, which will be apparent to those skilled in the art, for blocking transmission of voice frequency signals. At low frequencies, however, the inductor is ineffective in blocking frequency components which are below the normal telephone voice band and since ringing signals must be bypassed, there is a small frequency range in which the subject repeater would tend towards being unstable. This tendency towards instability is eliminated in this embodiment by providing a phase reversal in the signal bypass circuit connections 209 and 210 as shown in FIG. 2. This phase reversal eliminates reinforcement of the low frequency AC signal components passed via circuit connections 209 and 210 with those passed via the repeater gain units and, hence, further stabilizes the subject repeater.

It is noted that active canceller networks 216 and 224 may be of similar circuit configurations or of different configurations depending on the specific application of the repeater. The configurations may be different when one side of the repeater is connected, for example, to a telephone switch network and the other side is connected to a 2-wire telephone cable. In such an application the compromise canceller of FIG. 4 is employed on the switch side while the canceller of FIG. 3 is employed on the cable side.

FIG. 3 shows details of an active canceller network which may be employed in the bidirectional repeaters of FIGS. 1 and 2. The canceller network of FIG. 3 is intended for use with various lengths and gauges of loaded 2-wire telephone cable. The function G(s) realized by the circuit of FIG. 3 has been chosen to be substantially equal to the generalized complex transfer characteristic of Equation 1. It is noted, however, that the complex impedance Z(s) of Equation 1 varies according to the particular 2-wire telephone transmission facility connected to the repeater and, hence, the circuit realization of G(s) must be versatile enough to match the various telephone cable configurations available. In practice, the performance criteria for so-called hybrid circuits is that the so-caled normalized transhybrid loss be greter than 30 dB for the maximum cable length employed. We have determined that the complex transfer characteristic G(s) required to realize this objective is a fourth-order rational function of the form $$G(s) = K1 \frac{(s + z1)(s + z2)(s^2 + 2a\omega_z s + \omega_z^2)}{(s + p1)(s + p2)(s^2 + 2b\omega_p s + \omega_p^2)} \quad (7)$$

wherein pole-zero pair $(p1, z1)$ is primarily dependent on the transformer complex impedance and affects the transfer characteristic in the low frequency range, for example, below 400 Hz; pole-zero air $(p2, z2)$ is dependent on the cable gauge and affects the transfer characteristic in the low to mid frequency range, for example, 300 Hz to 2800 Hz; and the quadratic pairs of poles and zeros affect the transfer characteristic in the high frequency range, for example, 2800 Hz to 4200 Hz.

Since several different wire gauges are employed in the telephone plant it is necessary that pole-zero pair $(p2, z2)$ be adjustable. We have determined, however, that $p2$ and $z2$ each require only one unique value per wire gauge and that the value of $z2$ may be treated as a constant multiple of the value for $p2$ for most cable gauges. This realization greatly simplifies setting up of the repeater in practice. Additionally, since cable capacitance is crucial in the high frequency range and differs between certain cable gauges, it is necessary that the quadratic pole-zero pairs also be adjustable to accommodate different particular cable gauges.

One circuit which may be advantageously employed to realize the desired fourth-order transfer characteristic of Equation 7 is shown in FIG. 3. Accordingly, signals are supplied from the output of an associated gain unit via terminal 301 to a voltage divider including resistors 302 and 303 where the signal is amplitude scaled. In turn, the amplitude scaled signal is supplied via buffer amplifier 304 to so-called active biquad circuit 305 including amplifier 306 and associated circuit components as shown in FIG. 3. Buffer amplifier 304 is a high gain differential amplifier of the so-called operational type connected in a non-inverting configuration now well known in the art. Amplifier 304 provides isolation between the input voltage divider and biquad circuit 305.

Biquad 305 is a single amplifier active RC filter and is employed to realize the quadratic pole-zero pairs of Equation 7, namely $$K2 \frac{(s^2 + 2a\omega_z s + \omega_z^2)}{(s^2 + 2b\omega_p s + \omega_p^2)} \quad (8)$$

Details of biquad 305 including amplifier 306 and the associated circuit components, are discussed in U.S. Pat. No. 3,919,654 issued Nov. 11, 1975 to J. J. Friend and in particular in relation to FIG. 7 of the Friend patent. Resistors 307, 308 and 309 of biquad 305 are variable to adjust the resistance values for accommodating different telephone cable gauges. Although resistors 307, 308 and 309 are shown as continuously adjustable in practice switch arrangements are employed to adjust the values for the particular cable application. Specifically, the resistance values are reduced from an initial value selected to accommodate, for example 19, 22, 24 and 26 gauge 2-wire loaded telephone cable in order to accommodate 25 gauge 2-wire telephone cable commonly referred to as Metropolitan Area Trunk (MAT) cable. The resistance values are decreased so that the frequency roll-off or resonate frequency of biquad circuit 305 is moved to a higher frequency thereby more closely matching the complex frequency characteristic of the 25 gauge 2-wire loaded telephone cable.

The output of biquad 305 is supplied to capacitor 310 which in combination with resistor 311 generate pole-zero pair $(p1, z1)$ of Equation 7, namely $$\frac{(s + z1)}{(s + p1)} \quad (9)$$

in a manner which will be apparent to those skilled in the art. In turn, the signal from capacitor 310 is supplied to the non-inverting input of amplifier 312. Amplifier 312 is also of the high gain differential type commonly referred to as an operational amplifier and is connected in a so-called non-inverting configuration. Included in the feedback circuit between the output and negative input of amplifier 312 is a resistor-capacitor network including capacitor 313, fixed resistor 314 and variable resistors 315 and 316 connected in a prescribed relationship to realize pole-zero air $(p2, z2)$ of Equation 7, namely $$K3 \frac{s + z2}{s + p2} \quad (10)$$

in a manner which will be apparent to those skilled in the art. The value of resistor 315 is varied to adjust the values of $p2$ and $z2$ to compensate for different wire gauges. It is important to note that adjustment of the resistance value of resistor 315 causes the individual values of $p2$ and $z2$ to change but does not change the ratio of values of $p2$ and $z2$, which ratio remains constant. Variation of resistor 316, however, changes the ratio of the values of $p2$ and $z2$. This adjustment of resistor 316 is made to accommodate 25 gauge 2-wire loaded telephone cable. Although resistors 315 and 316 are shown as continuously adjustable, in practice appropriate switched resistances are more advantageously employed for setting the repeater for the particular wire gauge employed. The adjustment characteristics of this circuit are especially important since, as indicated above, we have determined that the ratio of values of $p2$ and $z2$ is constant for 2-wire loaded telephone gauges 19, 22, 24 and 26 but is different for 26 gauge. We have also determined that the values for $p2$ and $z2$ for 19, 22, 24 and 26 gauge 2-wire loaded telephone cable although a constant ratio for each gauge are different. Consequently, resistor 315 is adjustable to compensate for the several wire gauges.

Thus, in summary, output signals from an associated gain unit are supplied to input terminal 301 of the canceller network shown in FIG. 3 which yields a desired replica signal at output 320. Although the embodiment described herein for realizing the complex transfer function of Equation 7 is an active network it could be realized by employing a passive network if desired.

FIG. 4 shows details of a so-called compromise active canceller network which may be employed in the embodiments of the subject invention shown in FIGS. 1 and 2. A so-called compromise canceller network is employed when terminals of the subject repeater are to be connected to a telephone switch network. A reasonable representation of the complex impedance presented by a telephone switch network and associated telephone line is a compromise being in the order of 900 ohms in series with 2.15 microfarads. Consequently, the compromise canceller network shown in FIG. 4 has been designed to have a complex transfer characteristic for generating a signal which is substantially the replica of an error signal generated in the repeater when connected to a telephone switch circuit, namely $$G(s) = K4 \frac{(s + z3)(s + z4)}{(s + p3)(s + p4)} \quad (11)$$

where pole-zero pair (p3, z3) compensates for the phase characteristic of the complex transformer impedance and affects the transfer characteristic in a relatively high frequency range, for example, 30 kHz for p3 and 20 kHz for z3 and where pole-zero pair (p4, z4) emulates the complex impedance of the telephone switch and connecting telephone line, namely the compromise 900 ohms in series with 2.15 microfarads.

Referring to FIG. 4, incoming signals from an associated gain unit are supplied to terminal 401 and, in turn, via the parallel combination of capacitor 402 and resistor 403 to a voltage divider including resistors 404 and 405. The combination of capacitor 402 and resistors 403, 404 and 405 generates pole-zero pair (p3, z3) which, as indicated above, compensates for the phase characteristic of the coupling transformer used in the subject repeater. The voltage divider including resistors 404 and 405 is employed further to amplitude scale the incoming signal. Amplitude scaled signals are then supplied to the positive input of amplifier 406. Amplifier 406 is a differential amplifier of the high gain type commonly referred to as an operational amplifier and is connected in a non-inverting configuration. Capacitor 407 and resistors 408 and 409 are connected in the feedback circuit between the output and negative input of amplifier 406 and are employed to generate pole-zero pair (p4, z4) which effectively compensates for the telephone switch and connecting telephone line complex impedance. Consequently, the compromise canceller of FIG. 4 yields a desired replica signal at output 410 which is supplied to a corresponding gain unit to effect cancellation of an unwanted error signal.

Although the embodiment of the compromise canceller for realizing the function of Equation 11 is an active network, the desired function could be realized by employing a passive network.

FIG. 5 depicts details of a gain unit which may be employed in the embodiments of FIG. 1 and 2, taking unit 111 of FIG. 1 as typical. Accordingly, each of the gain units preferably includes differential amplifier stage 501 and equalizer stage 502. Normal signals, including an error signal developed across the secondary winding of an associated coupling transformer are supplied via input 110 to amplifier 503 while a replica of the error signal generated by a corresponding active canceller network is supplied via input 121 to amplifier 503. Amplifier 503 is also a differential amplifier of the high gain type commonly referred to as an operational amplifier. Amplifier 503 and associated resistors 504, 505, 506 and 507 are connected in a standard differential configuration for algebraically combining signals supplied via inputs 110 and 121 to yield at 508 a signal which is the algebraic difference of the supplied inputs, thereby yielding an output substantially free of error signal components. The input impedance of amplifier 503, i.e., the resistance value of resistor 506 in combination with resistor 507, should be sufficiently high so as to not unduly load the associated coupling transformer. The output from amplifier 503 is supplied by capacitor 509 and resistor 510 to the positive input of amplifier 511. Capacitor 509 and resistor 510 form a simple high-pass filter having a characteristic such that the frequency response of the gain unit and, hence, the repeater, rolls off at some predetermined rate in the low frequency range, for example, below 200 Hz. This roll-off insures that the repeater is stable in this low frequency range. Amplifier 511, in conjunction with resistors 512, 513 and 514 and potentiometer 515 form a non-inverting amplifier configuration with "flat" gain and is employed to adjust the gain characteristic of the embodiments of the instant invention. Although a potentiometer is shown for effecting the gain adjustment, any number of other arrangements may be equally employed, for example, switchable or adjustable attenuators may be used in a manner which will be apparent to those skilled in the art to obtain a desired so-called flat gain characteristic, i.e., one which is independent of frequency. It should also be noted that the gain adjustment is independent of the canceller adjustment, thus being unlike the prior art arrangements which employ line build-out networks where the gain adjustment is dependent on the impedance adjustment of the line build-out networks for matching a telephone line to the repeater and vice versa.

The output from amplifier 511 is supplied to equalizer 502. Equalizer 502 is a low-pass filter of a configuration known in the art for realizing a so-called second-order low-pass filter configuration and is employed in a manner well known to those skilled in the telephone repeater art to compensate for frequency response of telephone cables approximately between the frequencies of 1000 Hz and 3000 Hz. Additionally, equalizer 502 also provides a desired high frequency roll-off in the frequency range above 4000 Hz. This is to insure high frequency stability of the overall repeater circuit. One such low-pass filter circuit is shown in "Handbook of Operational Amplifier Active RC Networks" published by Burr-Brown Research Corporation, 1966, on page 80. The output of equalizer 502 is the desired normal output signal free of error signal components.

The above-described arrangements are, of course, merely illustrative of applications of the principles of the invention. Numerous other arrangements may be devised by those skilled in the art without departing from the spirit and scope of the invention. For example, with appropriate changes the subject invention may equally be employed for enhancing signals transmitted in bidirectional 2-wire non-loaded telephone facilities.

What is claimed is:

1. A signal transmission network which comprises:
   transformer means having a primary and a secondary,
   said primary being adapted to couple the transmission network to a 2-wire transmission facility and said secondary having first and second terminals, said first terminal being connected to a reference potential;

amplifier means having first and second inputs and an output and being arranged to amplify outgoing signals, said first input being connected in circuit with said second terminal of said transformer means secondary;

means connected in circuit relationship with said second terminal of said transformer means secondary for supplying incoming signals to said transmission network; and means connected in circuit between said incoming signal supplying means and said second input of said amplifier means and having a prescribed complex transfer characteristic for generating a signal which is substantially a replica of an error signal developed across said transformer means secondary in response to said incoming signals because of complex impedance components of the 2-wire transmission facility when connected to said transformer means primary, wherein said replica signal and said error signal are algebraically combined by said amplifier means substantially to effect cancellation of said error signal so that unwanted portions of said incoming signals are substantially eliminated from the outgoing signals from said amplifier means.

2. The transmission network of claim 1 wherein said replica signal generating means includes active network means for yielding said complex transfer chracteristic substantially equal to $$\frac{1}{1 + R/Z(s)}$$

wherein $Z(s)$ is a complex impedance developed across said transformer means secondary including complex impedance components of said 2-wire transmission facility when connected to said transmission network and complex impedance components of said transformer means and wherein R is a resistance value of the circuit connection between said incoming signal supplying means and said second terminal of said transformer means secondary.

3. The transmission network as defined in claim 1 wherein said replica signal generating means includes attenuation versus frequency determinate means yielding a prescribed second-order transfer function having first and second predetermined pole-zero pairs, values for said first pole-zero pair being selected to compensate for complex impedance components of said transformer means and values for said second pole-zero pair being selected to compensate for complex impedance components of said 2-wire transmission facility.

4. The transmission network of claim 1 wherein said replica signal generating means includes attenuation versus frequency determinate means for yielding a prescribed fourth-order transfer function having first and second pole-zero pairs and first and second quadratic pole-zero pairs, wherein said first pole-zero pair is selected to affect the attenuation versus frequency characteristic in a first prescribed frequency range, said second pole-zero pair is selected to affect the attenuation versus frequency characteristic in a second prescribed frequency range, and wherein said quadratic pairs of poles and zeros are selected to affect the attenuation versus frequency characteristic in a third prescribed frequency range, thereby compensating for complex impedance components of said 2-wire transmission facility and said transformer means.

5. The transmission network of claim 4 wherein said attenuation versus frequency determinate means includes adjustable means for varying said attenuation versus frequency characteristic to match the complex impedance of the particular type 2-wire transmission facility connected to said transformer means.

6. The transmission network of claim 5 wherein said adjustable means includes means for maintaining the ratio of values of said second zero and second pole a constant.

7. The transmission network of claim 6 wherein said adjustable means further includes means for adjusting the values of said second pole and second zero to vary the ratio of said values of said second pole and said second zero and includes means for varying the values of said quadratic pole-zero pairs.

8. A bidirectional signal transmission network which comprises:

first transformer means having a primary and a secondary, said primary being adapted to couple the transmission network to a first 2-wire transmission facility and said secondary having first and second terminals, said first terminal being connected to a reference potential;

second transformer means having a primary and a secondary, said primary being adapted to couple the transmission network to a second 2-wire transmission facility and said secondary having first and second terminals, said first terminal being connected to a reference potential;

first amplifier means having first and second inputs and an output and being arranged to amplify signals being transmitted in a direction from said first 2-wire transmission facility to said second 2-wire transmission facility, said first input being connected in circuit with said second terminal of said first transformer means secondary and said output being connected in circuit relationship with said second terminal of said second transformer means secondary;

second amplifier means having first and second inputs and an output and being arranged to amplify signals being transmitted in a direction from said second 2-wire transmission facility to said first 2-wire transmission facility, said first input being connected in circuit with said second terminal of said second transformer means secondary and said output being connected in circuit relationship with said second terminal of said first transformer means secondary;

first means connected in circuit between the output of said second amplifier means and said second input of said first amplifier means and having a prescribed complex transfer characteristic for generating a first signal which is substantially a replica of a first error signal developed across said first transformer means secondary in response to signals from said second amplifier means because of complex impedance components developed across said first transformer means secondary when said first 2-wire transmission facility is connected to said first transformer means primary; and second means connected in circuit between the output of said first amplifier means and said second input of said second amplifier means and having a prescribed complex transfer characteristic for generating a second signal which is substantially a replica of a second error signal developed across said second transformer means secondary in response to signals from said first amplifier means because of complex impedance components developed across said second transformer means secondary when said second 2-wire transmission facility is connected to said second transformer means primary, wherein said first replica signal and said first error signal are algebraically combined by said first amplifier means and wherein said second replica signal and said second error signal are algebraically combined by said second amplifier means substantially to effect cancellation of said first and second error signals so that said error signals are substantially eliminated from signals being transmitted on said first and second 2-wire transmission facilities.

9. The bidirectional signal transmission network of claim 8 wherein each of said first and second replica signal generating means includes active network means and attenuation versus frequency determinate circuit means for yielding prescribed complex transfer characteristics.

10. The bidirectional signal transmission network of claim 9 wherein said attenuation versus frequency determinate circuit means includes adjustable means for varying said complex transfer characteristic to match different 2-wire transmission facilities.

11. The bidirectional signal transmission network of claim 9 wherein one of said attentuation versus frequency determinate circuit means in conjunction with one of said active network means yields a complex second-order transfer characteristic including first and second predetermined pole-zero pairs, values for said first pole-zero pair being selected to compensate for the complex impedance characteristic of an associated one of said coupling transformer means and values for said second pole-zero pair being selected to compensate for the complex impedance of one of said 2-wire transmission facilities connected to said associated transformer means.

12. The bidirectional signal transmission network of claim 9 wherein said attenuation versus frequency determinate circuit means in conjunction with said active network means yields a complex fourth-order transfer characteristic including first and second pole-zero pairs and first and second quadratic pole-zero pairs, wherein values for said first pole-zero pair are selected to affect the attenuation versus frequency characteristic in a first prescribed frequency range, values for said second pole-zero pair are selected to affect the attenuation versus frequency characteristic in a second prescribed frequency range and values for said quadratic pole-zero pairs are selected to affect the attenuation versus frequency characteristic in a third prescribed frequency range, thereby to compensate for complex impedance components of an associated one of said transformer means and a 2-wire transmission facility connected to said associated transformer means.

13. The bidirectional signal transmission network of claim 12 wherein said attenuation versus frequency determinate means includes adjustable means for controllably varying the attenuation versus frequency characteristic to match the complex impedance of different ones of 2-wire transmission facilities when connected to an associated one of said transformer means.

14. The bidirectional signal transmission network of claim 13 wherein said adjustable means includes means for selectively adjusting the values of said second pole-zero pair while maintaining the ratio of the values of said second pole and said second zero a constant.

15. The bidirectional signal transmission network of claim 14 wherein said adjustable means further includes means for selectively adjusting the values of said second pole-zero pair to vary the ratio of the values of said second pole and said second zero.

16. The bidirectional signal transmission network of claim 15 wherein said adjustable means further includes means for varying the values of said quadratic pole-zero pairs.

17. The bidirectional signal transmission network of claim 16 wherein said first and second amplifier means includes means for adjusting gain of said transmission network.

* * * * *